United States Patent
Khristo

(10) Patent No.: US 7,392,974 B2
(45) Date of Patent: Jul. 1, 2008

(54) ROPE/WIRE PULLER

(75) Inventor: Marc Khristo, Walnut Creek, CA (US)

(73) Assignee: Marc M. Khristo, Lily, CA (US)

( * ) Notice: Subject to any disclaimer, the term of this patent is extended or adjusted under 35 U.S.C. 154(b) by 0 days.

(21) Appl. No.: 10/875,658

(22) Filed: Jun. 24, 2004

(65) Prior Publication Data

US 2006/0006370 A1 Jan. 12, 2006

(51) Int. Cl.
*B66F 3/00* (2006.01)
*A62B 35/04* (2006.01)
*B21F 9/00* (2006.01)

(52) U.S. Cl. .................. 254/247; 254/29 R; 24/134 R; 24/134 P; 294/132

(58) Field of Classification Search ............... 254/243, 254/245, 247; 294/132, 133, 135, 136, 15; 16/428, 442; 123/185.2; 24/134 R, 134 KB; 182/135, 136
See application file for complete search history.

(56) References Cited

U.S. PATENT DOCUMENTS

| 983,335 | A | * | 2/1911 | Westad | 182/135 |
| 996,259 | A | * | 6/1911 | Kern | 254/29 R |
| 1,520,716 | A | * | 12/1924 | Judd | 24/134 P |
| 3,938,620 | A | * | 2/1976 | Nothiger | 182/135 |
| 4,253,218 | A | * | 3/1981 | Gibbs | 24/134 R |
| 4,632,442 | A | * | 12/1986 | Gerding | 294/16 |
| 4,843,687 | A | * | 7/1989 | Kroepelin, Jr. | 24/134 P |
| 5,133,111 | A | * | 7/1992 | Brown | 24/134 R |
| 7,076,844 | B2 | * | 7/2006 | Skyba | 24/134 R |

* cited by examiner

*Primary Examiner*—Evan Langdon

(57) ABSTRACT

A rope/wire pulling device designed to provide maximum pulling pressure by the use of two handles and a non-slip ratcheting clutch which grasps the rope or wire tighter as additional pulling pressure is applied.

18 Claims, 2 Drawing Sheets

ROPE/WIRE PULLER

BACKGROUND

The present invention relates to a hand tool for pulling and stringing wire, rope or cable through building walls, ceilings, pipes and conduits, by use of a one way ratcheting die.

Electricians are routinely required to pull wires through lengthy conduits or pipes. It is not uncommon for such conduits to stretch many feet in length and contain a number of elbows and turns which increase the difficulty of pulling wires through the conduits.

The typical technique for pulling wires through a conduit entails initially pushing a length of resilient spring steel fish tape through the conduit. The fish tape has a substantially rectangular cross section which, in combination with its spring steel construction, allows it to bend around corners within the conduit while maintaining sufficient rigidity to be pushed a considerable distance. A flexible leader with a rounded tip is attached to a free end of the fish tape. The leader enhances the ability to negotiate corners as the fish tape is pushed through the conduit. After the leader reaches the terminal end of the conduit, the electrical wires are attached to the leader. The fish tape and attached wires are then pulled back through the conduit until the leader and the end of the electrical wires exit the end of the conduit into which the leader was initially pushed.

When pulling the wire, one person pulls the fish tape from the one end of the conduit while a second person feeds the electrical wire into the other end of the conduit. The fish tape and the wires are pushed and pulled in increments or strokes of several feet at a time. The two people at opposite ends of the conduit develop a rhythm which allows them to pull and feed wire at the same time, and this rhythm enhances the speed and ease by which the wire is pulled.

Existing pipe pulling devices, such as U.S. Pat. No. 996,259 issued to Kern, are limited to large diameter rigid materials such as pipe, and do not allow the pulled material to be easily travel through the device once the pressure is released. Such conventional devices utilizes a hand tightening screw to allow the device to engage with the pipe and do not automatically adjust with changes in pipe diameter. For example, the Kern device does not automatically adjust to change in pipe diameter and therefore instantly releases a smaller diameter pipe until a hand screw is adjusted by a user to provide pressure on the smaller diameter pipe.

Although the fish tape/cable is sometimes guided by hand, it is difficult to adequately grip the tape when pushing long distances or when pulling a large number of electrical wires, due to the heavy force required to maneuver the tape and the attached wires through the conduit. To gain additional force, a hand tool such as a pair of pliers is typically used to grip the cable. Pliers are frequently used due to the ready availability of pliers within the electrician's tool belt or toolbox.

However, pliers are inconvenient and inefficient for lengthy wire pulls due to the large number of individual pulling strokes required. With each stroke, the electrician must release the jaws of the pliers from the tape and then firmly re-grip the tape at a point several feet further away. Time is lost in releasing and firmly resetting the pliers for each pulling stroke of the fish tape. Furthermore, it is often difficult to maintain the pushing and pulling rhythm or the rhythm proceeds at a slow pace, when pliers are used.

Furthermore, electricians typically pull the cable with only the one hand which holds the pliers. Consequently, some electricians develop back problems due to repeatedly pulling the heavily loaded cable with one hand, because of the detrimental erogomic position in which pulling occurs. Also, Pliers come with a risk of the cable slipping through it any time.

Although pliers are the predominant hand tool used for pulling electrical wire, other tools have been developed for the sole purpose of gripping or pulling fish tape. However, these tools suffer from one or more disadvantages which have precluded their widespread acceptance by electricians.

SUMMARY

The present invention is embodied in a new method and apparatus or tool system for pulling ropes or wire through a building wall, panel, conduit, and the like. This invention relates to pulling electrical wires through conduits and pipes, and more particularly, to a methodology and a tool for gripping ropes or wires while needing to pull them with great force.

One embodiment of the present invention is a hand tool for gripping with both hands. The tool includes two rubber grip points at each end. In one embodiment, the device or tool consists of an 18"×1" rigid pipe with a rubber hand grip on each end. Attached to the center of the pipe is a device that is adapted to allow rope to pass therethrough. The side of the device is open, allowing the ability to insert the rope at any given point along the length of the rope. This eliminates having to feed and pull the rope all the way through. The device contains a ratcheting clutch which upon pulling tightens down on the rope thereby gripping it. In operation, the harder a user pulls the hand tool, the more the ratcheting clutch tightens down.

It is therefore an object of the present invention to provide a new rope/wire pulling device apparatus and method which has many of the advantages of the closures mentioned heretofore and many novel features that result in a rope/wire pulling device which is not anticipated, rendered obvious, suggested, or even implied by any of the prior art tool guides, either alone or in any combination thereof.

It is another object of the present invention to provide a new wire pulling device which may be easily and efficiency manufactured and marketed.

It is a further object of the present invention to provide a new rope/wire pulling device which is of a durable and reliable construction.

An even further object of the present invention is to provide a new rope/wire pulling device which is susceptible of a low cost of manufacture with regard to both materials and labor, and which accordingly is then susceptible of low prices of sale to the consuming public, thereby making such rope/wire pulling devices economically available to the buying public.

Still yet another object of the present invention is to provide a new rope/wire pulling device which provides in the apparatuses and methods of the prior art some of the advantages thereof, while simultaneously overcoming some of the disadvantages normally associated therewith.

Yet another object of the present invention is to provide a new rope/wire pulling device which includes a main body, rope/wire holding channel, spring-loaded ratcheting clutch and hand grips at both ends.

A better understanding of the nature and advantages of the present invention may be gained with reference to the following detailed description and the accompanying drawings.

DESCRIPTION OF EXEMPLARY EMBODIMENTS

Figure 1:
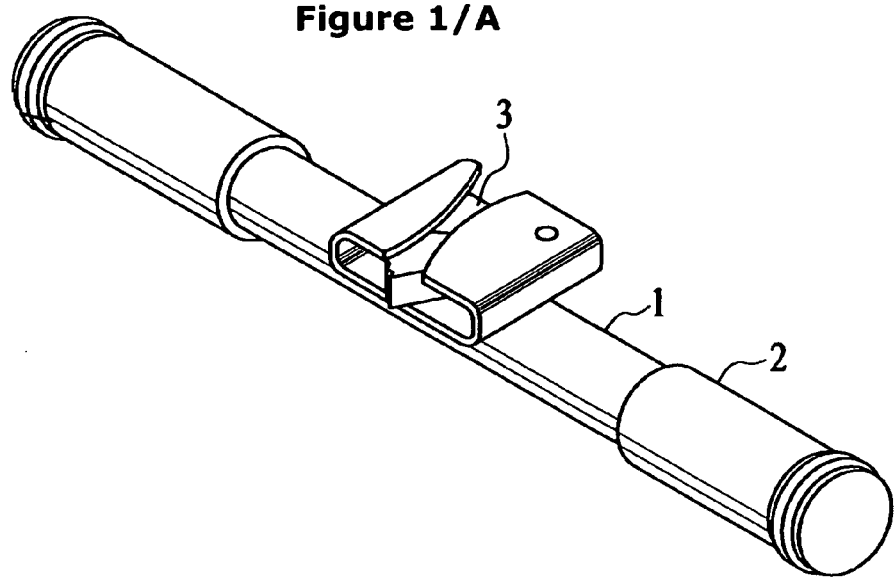
FIG. 1A is a perspective view of a hand tool used to grip wires or ropes illustrating an entrance side of a ratchet housing in accordance to exemplary embodiments of the present invention.
FIG. 1B is a perspective view of a hand tool used to grip wires or ropes illustrating an exit side of the ratchet housing of FIG. 1B in accordance to exemplary embodiments of the present invention.
Figure 1:
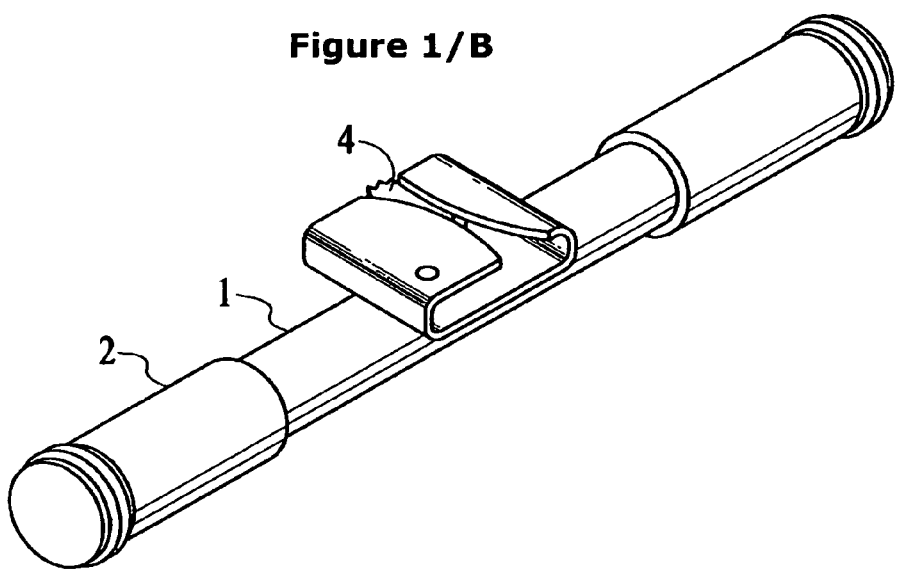

FIG. 1A and FIG. 1B are perspective views of a hand tool 100 used to grip wires or ropes. FIG. 1A illustrates an entrance side and FIG. 1B illustrates an exit side of a ratchet housing 110. In one embodiment, hand tool 100 consists of a rigid pipe 130 with a rubber hand grip 140 on each end. In one embodiment, the pipe may be 18" in length by 1" in diameter, for example. Attached to the center of the pipe 130 is ratchet housing 110. Ratchet housing 110 is adapted to allow rope or wires to pass therethrough. As depicted, the ratchet housing 110 can be attached to the rope or wire through an entry slot 112 located along the side of the ratchet housing 110. For example, entry slot 112 may be adapted with sufficient width to allow a rope to be inserted therein without the need to feed rope through the ratchet housing 110 using either end of the rope. In one embodiment, entry slot 112 will accommodate rope or wires in sizes from 0.25" to 0.75".

In one embodiment, ratchet housing 110 contains a ratcheting clutch 120 which upon pulling hand tool 100 in an direction to engage the rope or wire, tightens down on the rope, intern gripping the rope. Once the ratchet housing 110 is placed onto the rope or wire (e.g., via entry slot 112), ratcheting clutch 120 grasps the rope or wire once force is applied in a pulling motion, e.g., a gripping direction. Ratcheting clutch 120 rotates around spring-loaded point 142 and may include a gripping edge 122. Gripping edge 122 may include teeth 124 to further provide grip force on a rope or wire.

Figure 2:
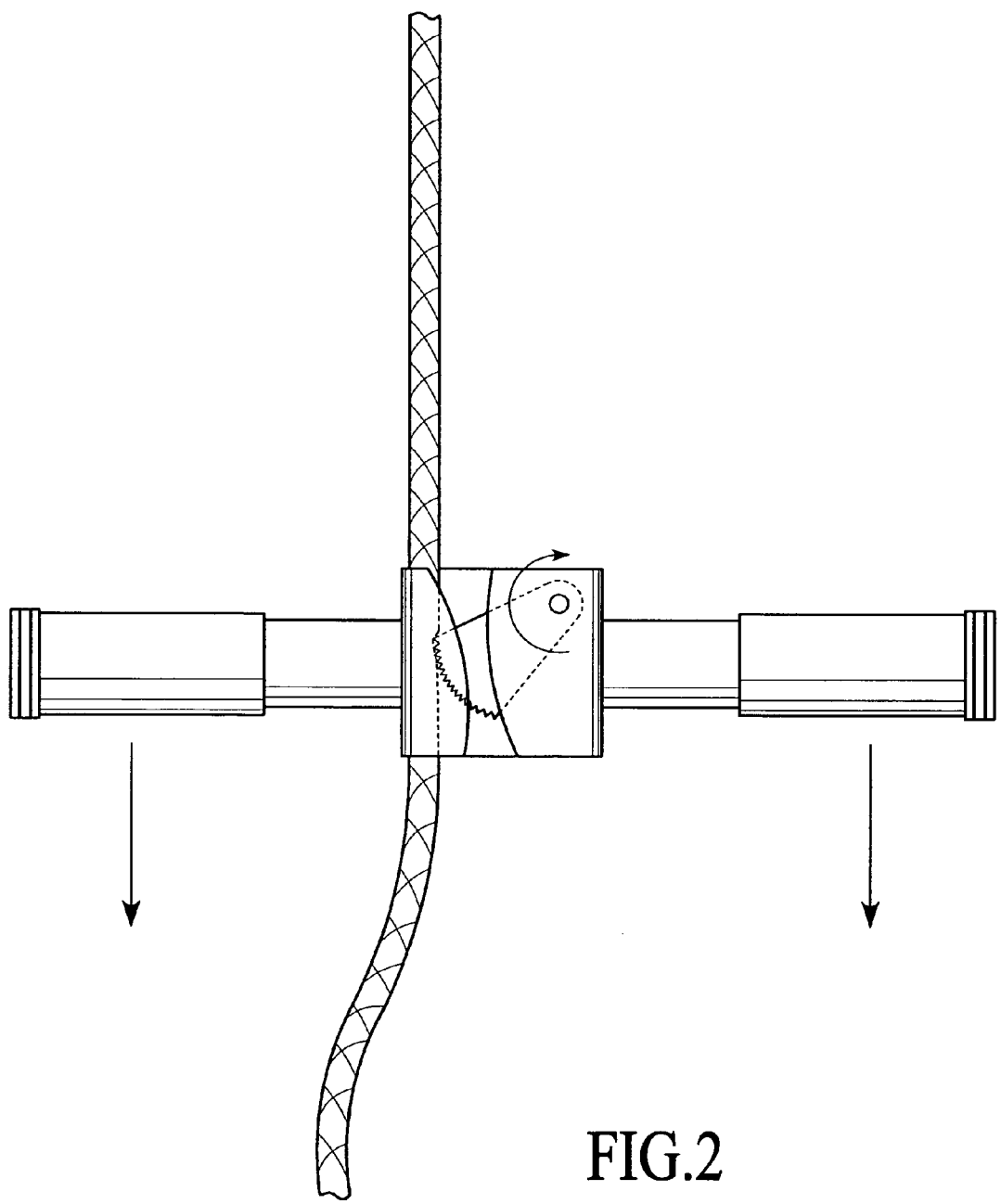
FIG. 2 is a simplified top-view of the ratchet housing of FIG. 1B and FIG. 1B in accordance to exemplary embodiments of the present invention.

FIG. 2 is a simplified top-view of the ratchet housing of FIG. 1B and FIG. 1B. As illustrated in FIG. 2, a rope or wire 204 may be slid into entry slot 112 an positioned adjacent ratcheting clutch 120. As illustrated in FIGS. 1 and 2, entry slot 112 may be curved to have a larger opening on each side of the enclosure 110 to guide the rope or wire 204 in and out of the housing 110. Spring-loaded pin 142 is configured to provide enough force to force the gripping edge 122 against the surface of rope or wire 204. Due to the rotation of ratcheting clutch 120 around spring-loaded point 142 in response to the friction with rope or wire 204, in the gripping direction, rope or wire 204 is pinched between a sidewall 250 of the ratchet housing 110 and gripping edge 122 of ratcheting clutch 120, thereby gripping the rope or wire 204.

As rope or wire 204 is pulled harder, and/or due to the softness of the rope or wire 204 material, the diameter of the rope or wire 204 may decrease or increase in response to the pulling force, or lack thereof. As the diameter of the rope or wire 204 decreases or increases, spring-loaded pin 142, along with the motion of the rope/wire 204, rotates ratcheting clutch 120 accordingly to urge the rope or wire 204 toward the sidewall 250 thereby squeezing the rope or wire 204 between the gripping edge 122 and the sidewall 250 to generate an increased gripping force.

Thus, due to the ratcheting action of ratcheting clutch 120, the harder hand tool 100 is pulled in a pulling direction, the more hand tool 100 tightens down on the rope or wire 204. Once the rope or wire 204 has been pulled any given distance, ratchet housing 110 may be slid further down the rope or wire 204 in the opposite direction from the pulling direction to release the ratcheting clutch 120, without the need of the user to adjust or release ratcheting clutch 120. Therefore, due to the ratcheting action of ratcheting clutch 120, the user does not have to remove their hands from the hand tool 100 in order to pull the rope or wire, or move the hand tool 100 to a new pulling position.

The present invention thus provides various techniques for pulling wire or rope through conduits. While the above provides a detailed description of various embodiments of the invention, many alternatives, modifications, and equivalents are possible. Therefore the scope of this invention should not be limited by the specific embodiments described above, and should instead be determined with reference to the appended claims along with their full scope of equivalents.

I claim:

1. An apparatus for pulling wire or rope, the apparatus comprising:

a gripping device that includes a substantially enclosed rigid housing that comprises a bottom wall, a top wall opposite the bottom wall, a first side wall connecting the top and bottom walls an a second side wall opposite the first side wall, a slot disposed in a top wall of the housing for receiving a section of rope or wire therein, said rope or wire having a diameter;

a handle member fixedly attached to the bottom wall of the housing configured with handles that extend on opposite sides of the housing;

at least one ratcheting member rotatably mounted to the gripping device between the top wall and the bottom wall of the housing, wherein in response to moving the gripping device in a first direction along a length of the wire or rope disposed in the slot, the at least one ratcheting member is configured to rotatably engage the wire or rope such that the at least one ratcheting member squeezes the wire or rope between the second sidewall of the housing and the at least one ratcheting member to generate a gripping force, wherein when the rope or wire is engaged by the ratcheting member, at least a portion of the top wall extends past the rope or wire diameter, wherein when the gripping device is moved in a second direction along the length of the wire or rope, the at least one ratcheting member is configured to rotate to release the gripping force, and wherein when the wire or rope is disposed within the housing, the portion of the top wall, the second sidewall, and the at least one ratcheting member are prevent the wire or rope from exiting the slot when the rope or wire moves along the second direction relative to the second sidewall.

2. The apparatus of claim 1, wherein the handle member is an elongated member with said two handles configured to be gripped by two hands.

3. The apparatus of claim 1, wherein the at least one ratcheting member is pivotally mounted on one end and spring loaded such that the ratcheting member rotates to engage the rope or the wire disposed in the slot.

4. The apparatus of claim 1, wherein the at least one ratcheting member comprises a pivoting end distal a gripping end.

5. The apparatus of claim 4, wherein the gripping end comprises a rough surface configured to grip the rope of the wire.

6. The apparatus of claim 4, wherein the rough surface comprises teeth configured to grip the rope of the wire.

7. The apparatus of claim 1, wherein the slot is disposed in top wall of the gripping device and aligned to allow the section of rope or wire to pass lengthwise into the gripping device and between the ratcheting member and the second sidewall.

8. The apparatus of claim 7, wherein the slot comprises an opening portion sized larger than a center portion of the slot, wherein the opening portion is configured to guide the rope or the wire into the center portion.

9. The apparatus of claim 7, wherein the slot comprises an exit portion sized larger than a center portion of the slot, wherein the exit portion is configured to guide the rope or the wire from the center portion.

10. A method for pulling wire or rope, the method comrising:
receiving a wire or rope through a slot disposed in a rigid enclosure that comprises a bottom wall, a top wall opposite the bottom wall, a first side wall connecting the top and bottom walls an a second side wall opposite the first side wall, a slot disposed in a top wall of the housing for receiving a section of rope or wire therein, said rope or wire having a diameter;
wedging the wire or the rope between a gripping surface of a rotating clutch member and the stationary second sidewall of the enclosure housing said rotating clutch member being rotatably attached between top stationary wall and bottom stationary wall of the enclosure; and
pulling the enclosure along the wire or rope in a first direction using a handle member rigidly attached to the bottom wall of the enclosure, said handle member including handles extending on opposite sides of the enclosure, wherein the rotating clutch member is configured to rotate in response to a pull resistance of the wire or rope directed in opposition to the first direction, or in response to a change in a diameter of the wire or rope, thereby moving the gripping surface toward the stationary second sidewall, wherein the gripping surface and the stationary second sidewall generate a gripping force that is responsive to the change in pull resistance wherein when the wire or rope is disposed within the enclosure, the stationary second sidewall, the top stationary wall of the enclosure, and the rotating clutch member are configured to prevent the wire or rope from exiting the slot when the rope or wire moves in a direction in opposition to the first direction.

11. The method of claim 10, wherein wedging comprises positioning the rope or the wire through the slot of the enclosure between the stationary second sidewall, the top stationary wall of the enclosure, and the rotating clutch member.

12. The method of claim 10, wherein the gripping surface comprises teeth.

13. The method of claim 10, wherein pulling comprises rotating the rotating clutch member such that the gripping surface is urged against the wire or rope.

14. The method of claim 10, wherein the gripping force increases with an increase in pulling force on the wire or rope.

15. The apparatus of claim 1, wherein the rotating ratcheting member comprises a gripping edge configured to impart friction to the wire when the rotating ratcheting member is rotated against the wire.

16. The apparatus of claim 1, wherein the rotating ratcheting member is pivotally coupled to the housing on one end with a pin.

17. The apparatus of claim 1, wherein the slot comprises curved sidewalls configured to cooperatively provide an opening portion and an exit portion that are larger than a center portion of the slot.

18. The apparatus of claim 1, wherein the rope or wire is a rigid pipe.

* * * * *